(No Model.) 2 Sheets—Sheet 1.
J. REED.
LANDING NET FRAME.
No. 479,157. Patented July 19, 1892.
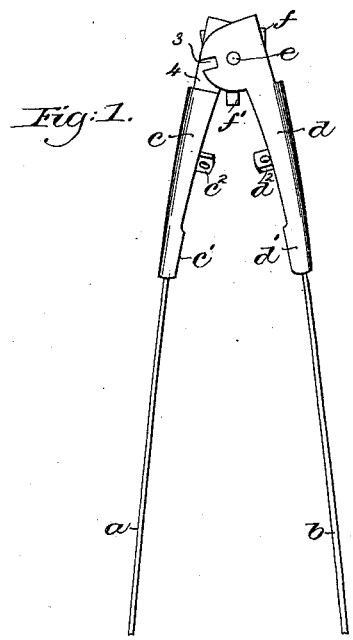
Fig. 1.
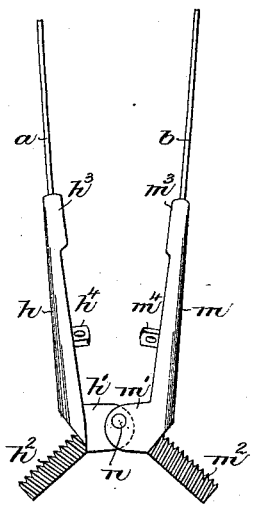
Witnesses.
Frederick L. Emery
Edgar R. Goddin
Inventor.
James Reed,
by Crosby & Gregory
Attys
THE NORRIS PETERS CO., PHOTO-LITHO., WASHINGTON, D. C.

(No Model.) 2 Sheets—Sheet 2.
J. REED.
LANDING NET FRAME.
No. 479,157. Patented July 19, 1892.
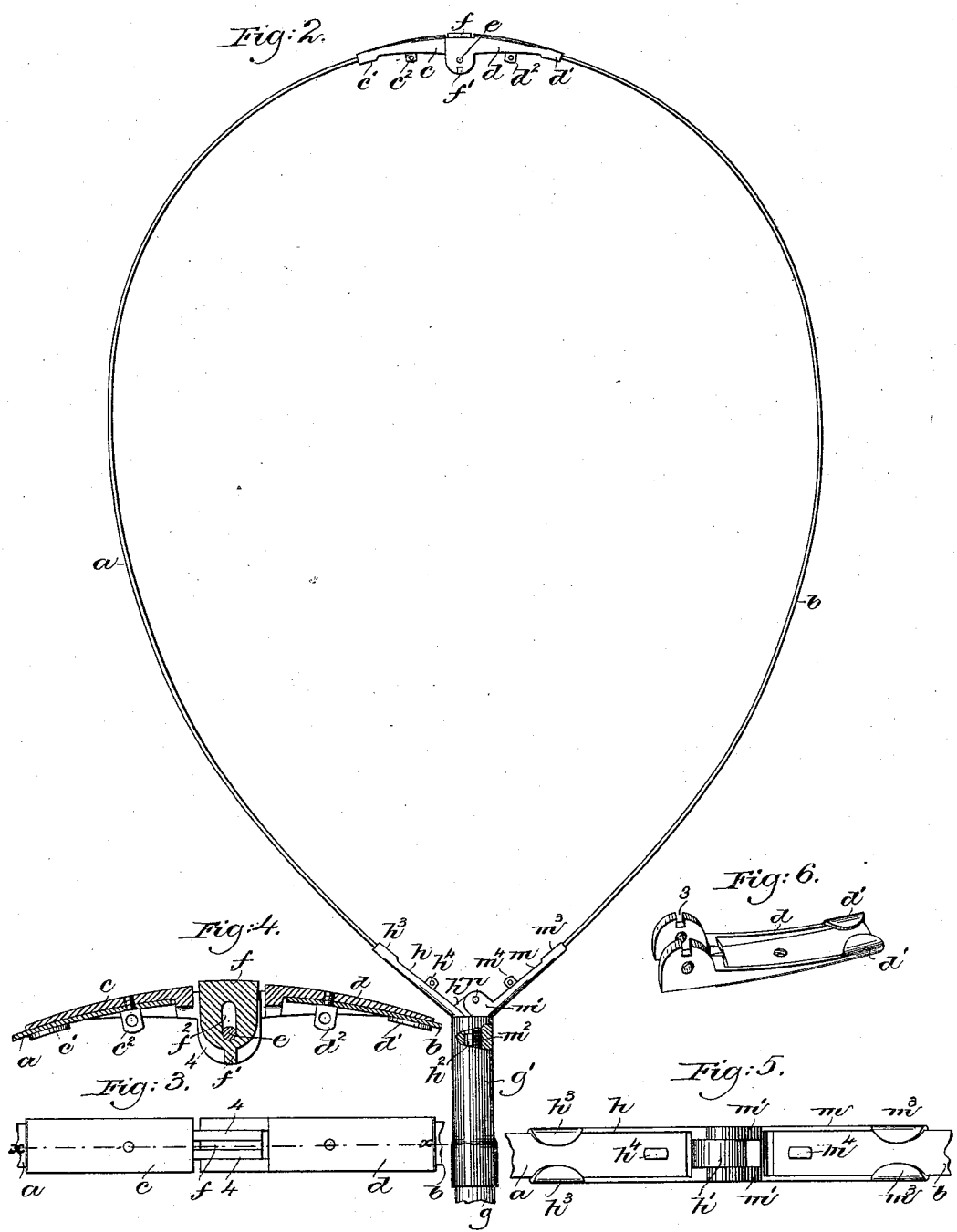
Witnesses. 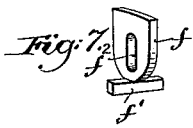 Inventor.

United States Patent Office.

JAMES REED, OF CAMBRIDGE, MASSACHUSETTS.

LANDING-NET FRAME.

SPECIFICATION forming part of Letters Patent No. 479,157, dated July 19, 1892.

Application filed September 24, 1889. Serial No. 324,931. (No model.)

*To all whom it may concern:*

Be it known that I, JAMES REED, of Cambridge, county of Middlesex, State of Massachusetts, have invented an Improvement in Landing-Net Frames, of which the following description, in connection with the accompanying drawings, is a specification, like letters on the drawings representing like parts.

This invention has for its object to simplify and improve the construction of landing-net frames, my invention being an improvement on that described in United States Patent No. 367,928, granted to me August 9, 1887.

In this my present invention the joint-piece of the frame which is to be connected with the ferrule of the hand-piece is composed of two arms hinged together, preferably, by a knuckle or rule joint, each arm having a substantially half-round threaded shank. These arms, as shown, are provided with overturned lips or ears to form open sockets for the reception of the ends of the flexible side bars, which are secured in place by set-screws. The joint at the outer ends of the flexible side bars of equal length is also composed of two arms hinged together permanently by preferably a knuckle or rule joint having co-operating with it a locking device to keep the said joint open.

My invention consists, essentially, in the combination, with the side bars of a landing-net frame and ferrule, of a joint-piece having two half-round threaded shanks, which, when the joint is opened to expand the side bars into hoop form, come together and form a cylindrical shank to enter the said ferrule, substantially as will be described; also, in the combination, with the side bars, of a landing-net frame and a joint-piece composed of two pieces permanently hinged together, of a lock to keep the said joint-piece open, substantially as will be described.

Figure 1 represents a landing-net frame embodying my invention, the side bars being partially broken out to save space on the drawings, the frame being shown as collapsed. Fig. 2 shows the frame expanded for use, together with part of the net-handle and ferrule at the end of the same, the latter being partially broken out to show the shanks closed. Fig. 3 is an outside view of the outer joint of the frame; Fig. 4, a section of the same in the line $x$, Fig. 3. Fig. 5 is an inner side view of the joint next the handle and ferrule. Fig. 6 shows the arm $d$ of the outer joint, and Fig. 7 shows the lock detached.

The side bars $a\ b$ are preferably of steel or strong flexible material.

The outer joint of the frame is composed of two arms $c\ d$, hinged together by a pin $e$, the meeting ends of the said arms being shaped like a knuckle or rule joint. (See Fig. 3.) The ears at their ends, which are hinged together, are notched, as represented by the notch 3, (see Fig. 6,) immediately below the pin $e$, and between the ears 4 4 of the arms $c$ I have interposed a lock, (shown as a slide $f$,) slotted at $f^2$ and having at its lower end a bar $f'$ to enter the series of notches 3 of the said ears when the frame is expanded, as in Fig. 2, Figs. 3 and 4 showing the lock as pushed out to lock the ears and keep the joint open. The arms $c\ d$ have, respectively, overturned lips $c'\ d'$, behind which are inserted the bars $a\ b$, the said bars being held in place, as shown, by set-screws $c^2\ d^2$, having their heads provided with holes for the insertion of a piece of wire or other device by which to turn the screws, and also to enable anything to be tied to the screws.

The joint of the frame nearest the handle $g$, having the ferrule $g'$, which is screw-threaded internally, is composed of two arms $h\ m$, having ears $h'\ m'\ m'$, (shown as put together as a knuckle or rule joint and jointed by a pin $n$,) the arm $h$ having a half-round shank $h^2$, while the arm $m$ has a half-round shank $m^2$, both shanks being screw-threaded, so that when the frame is expanded the two shanks come together and form a round shank, which is screwed into the ferrule $g'$, the elasticity of the bars $a\ b$ normally acting to separate the shanks, and acting, also, to prevent the frame and handle rotating separately by accident, such connection forming a very stiff, strong, and durable joint between the frame and ferrule, doing away with any locking device at that point and making the frame very easy to handle with accuracy. The arms $h\ m$ are provided with inturned lips $h^3\ m^3$, like the lips $c'\ d'$, behind which lips $h^3\ m^3$ the bars $a\ b$ are inserted, as best shown in Fig. 5, the bars being held in place by the set-nuts $h^4\ m^4$, like the ones marked $c^2\ d^2$. The lips on the arms form sockets for the reception of the side bars. The arms $h\ m$ and $c\ d$, between their joints and the lips referred to, are recessed or channeled to receive the side bars and prevent any lateral motion of the said bars.

I claim—

1. The side bars of the landing-net frame and the ferrule $g'$, combined with the joint composed of two arms pivoted together and having each a threaded shank, said shanks when brought together forming a threaded hub to enter the said ferrule, the said arms receiving and holding the said side bars, substantially as described.

2. A side bar of a landing-net and the joint at its outer end hinged together permanently by the pin $e$ and notched, as described, combined with an independently-movable lock to engage notches of the said joint and keep it open, substantially as described.

3. In a landing-net frame, the two arms $h\ m$, hinged together and provided with shanks, and the side bars inserted in the said sockets, combined with means to hold the said arms in the said sockets, substantially as described.

4. In a landing-net frame, the two arms $h\ m$, having lips and recessed, as described, and hinged together, combined with two side bars, substantially as described.

5. In a landing-net frame, the socketed arms $c\ d$, permanently jointed together, and a lock for the same, shanks and two arms $h\ m$, permanently jointed together and having sockets and threaded shanks, combined with two flexible side bars connected rigidly to the said arms, and with a ferrule to receive the said threaded shanks, substantially as described.

6. A joint composed of two pivoted sections, each section having a side-bar carrier and a semi-cylindrical shank with threads on the outer surface, the threaded shanks of said sections forming, when brought together in the movement of the sections upon their pivot, a threaded hub for engaging with a correspondingly screw-threaded ferrule, and the carriers at the opposite ends of said sections for engaging with the free ends of a net-frame.

In testimony whereof I have signed my name to this specification in the presence of two subscribing witnesses.

JAMES REED.

Witnesses:
GEO. W. GREGORY,
A. S. WIEGAND.